(12) United States Patent
Saes et al.

(10) Patent No.: US 11,264,910 B2
(45) Date of Patent: Mar. 1, 2022

(54) POWER CONVERTER FOR LED

(71) Applicant: EldoLAB Holding B.V., Son en Breugel (NL)

(72) Inventors: Marc Saes, Son en Breugel (NL); Nicolaas Johannes Antonius Gommans, Son en Breugel (NL); Franciscus Bernardus Marie Van Horck, Son en Breugel (NL)

(73) Assignee: eldoLAB Holding B.V., Ed Son En Breugel (NL)

( * ) Notice: Subject to any disclaimer, the term of this patent is extended or adjusted under 35 U.S.C. 154(b) by 0 days.

(21) Appl. No.: 16/971,998

(22) PCT Filed: Feb. 28, 2019

(86) PCT No.: PCT/NL2019/050128
§ 371 (c)(1),
(2) Date: Aug. 21, 2020

(87) PCT Pub. No.: WO2019/168399
PCT Pub. Date: Sep. 6, 2019

(65) Prior Publication Data
US 2021/0006168 A1 Jan. 7, 2021

(30) Foreign Application Priority Data
Feb. 28, 2018 (NL) ....................... 2020507

(51) Int. Cl.
*H05B 45/30* (2020.01)
*H02M 3/335* (2006.01)
(Continued)

(52) U.S. Cl.
CPC ... *H02M 3/33507* (2013.01); *H02M 3/33515* (2013.01); *H05B 45/3725* (2020.01);
(Continued)

(58) Field of Classification Search
CPC ...... H05B 45/38; H05B 45/44; H05B 45/375; H05B 45/385; H05B 45/397; H05B 45/3725
See application file for complete search history.

(56) References Cited

U.S. PATENT DOCUMENTS 8,391,028 B2 * 3/2013 Yeh .................... H02M 3/33507
363/21.05
9,711,996 B2 7/2017 Han et al.
(Continued)

FOREIGN PATENT DOCUMENTS

WO 2005053143 A1 6/2005
WO 2013003673 A1 1/2013
(Continued)

OTHER PUBLICATIONS

International Search Report for International Application No. PCT/NL2019/050128, dated Aug. 16, 2019, 4 pages.
(Continued)

*Primary Examiner* — Tung X Le
(74) *Attorney, Agent, or Firm* — RatnerPrestia

(57) ABSTRACT

A power converter powers an LED fixture from a power supply, and comprises
  a primary circuit
    a primary winding; and
    a switch in series connection with the primary winding to in a conductive state of the switch connect the primary winding to the power supply;
  a secondary circuit comprising
    a secondary winding that is magnetically coupled with the primary winding for providing power to the LED fixture in response to a switching of the switch;
  the power converter further comprising:
  the power converter further comprising:
(Continued)

a sensing circuit configured to generate a signal representative of the output voltage of the secondary winding, an edge of the signal representing an edge of the output voltage of the secondary winding in response to the switching of the switch; and a detecting circuit configured to derive timing data from the edges of the signal, to estimate a load of the power converter from at least one output parameter of the power converter, and to determine a momentary value of a voltage of the power supply from the timing data and the estimated load of the power converter.

27 Claims, 10 Drawing Sheets

(51) Int. Cl.
*H05B 45/385* (2020.01)
*H05B 45/3725* (2020.01)
*H05B 45/375* (2020.01)
*H05B 45/38* (2020.01)

(52) U.S. Cl.
CPC ......... *H05B 45/385* (2020.01); *H05B 45/375* (2020.01); *H05B 45/38* (2020.01)

(56) References Cited

U.S. PATENT DOCUMENTS

| | | |
|---|---|---|
| 2008/0278973 A1 | 11/2008 | Lin et al. |
| 2011/0309759 A1* | 12/2011 | Shteynberg ............ H05B 45/37 315/201 |
| 2013/0020965 A1* | 1/2013 | Kang ................... H05B 45/385 315/297 |
| 2014/0268938 A1 | 9/2014 | Matthews et al. |
| 2015/0078047 A1* | 3/2015 | Sutardja ................. H05B 45/37 363/78 |
| 2016/0014861 A1* | 1/2016 | Zhu ....................... H05B 39/044 315/223 |
| 2016/0172981 A1* | 6/2016 | Gritti ................ H02M 3/33507 363/21.12 |
| 2016/0190941 A1* | 6/2016 | Kuang .................. H05B 45/37 363/21.01 |
| 2017/0025958 A1* | 1/2017 | Yu ........................... G06F 1/266 |
| 2018/0279431 A1* | 9/2018 | Schaemann ....... H02M 3/33523 |

FOREIGN PATENT DOCUMENTS

| | | |
|---|---|---|
| WO | 2017089120 A1 | 6/2017 |
| WO | 2017099594 A1 | 6/2017 |

OTHER PUBLICATIONS

Netherlands International Search Report for International Application No. 2020507, dated Nov. 27, 2018, 11 pages.
Official Action for European Patent Application No. EP 19719935.9, dated Jun. 10, 2021, 5 pages.

* cited by examiner

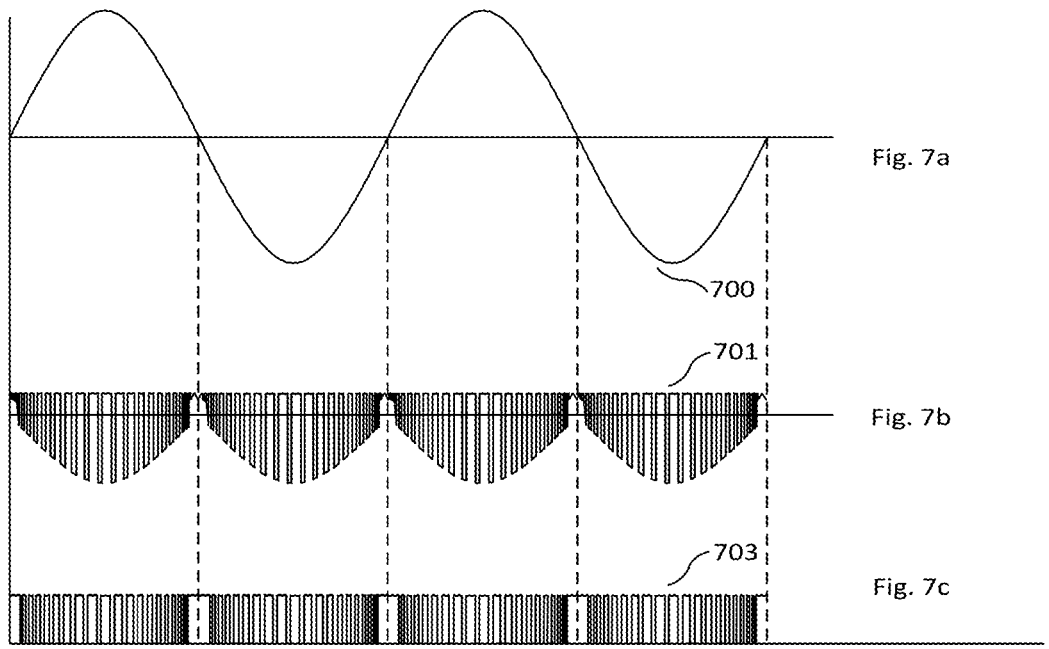
Fig. 7a
Fig. 7b
Fig. 7c
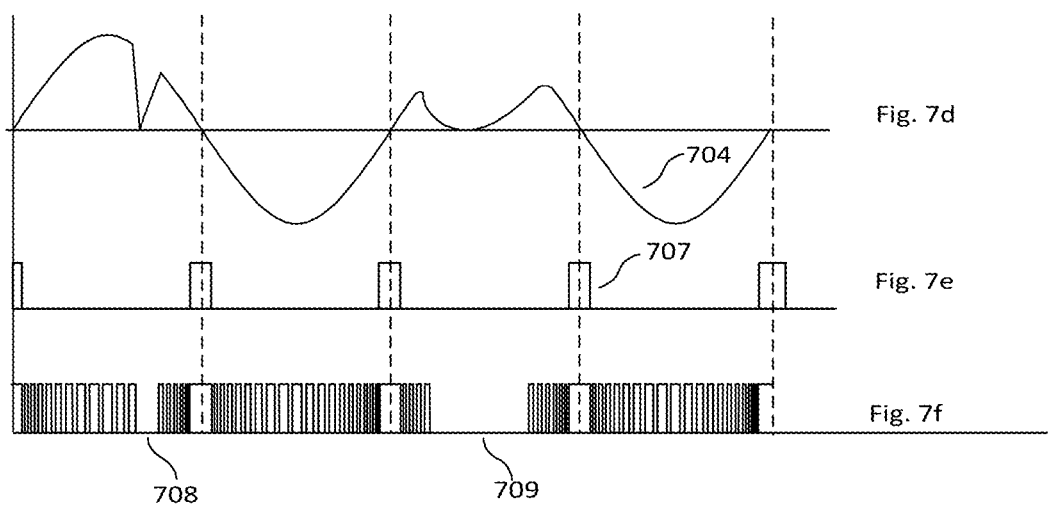
Fig. 7d
Fig. 7e
Fig. 7f

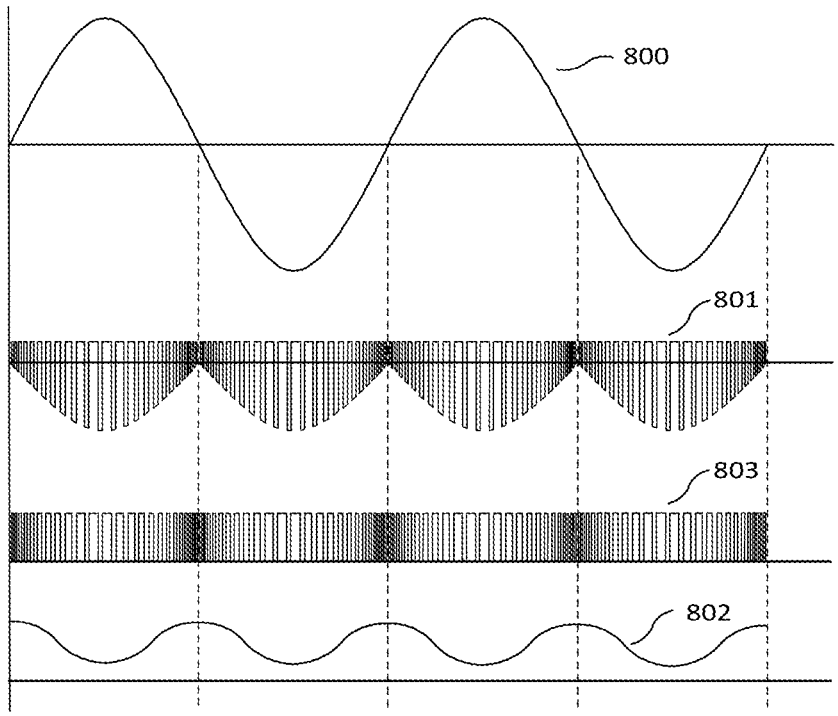
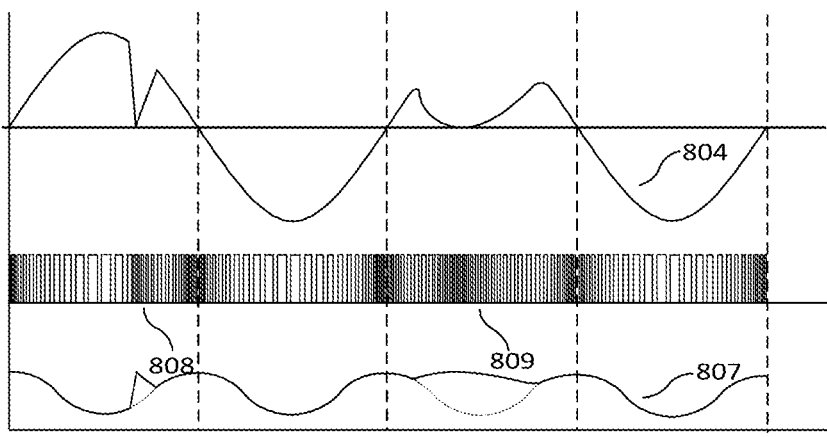

POWER CONVERTER FOR LED

RELATED APPLICATIONS

This application is a U.S. National Phase Patent Application of International Application No. PCT/NL2019/050128, filed Feb. 28, 2019, which claims priority to Netherlands Application No. NL 2020507, filed Feb. 28, 2018, the disclosures of which are entirely incorporated herein by reference.

The present invention relates to the field of LED drivers, and more specifically to power converters, such as flyback converters, as applied in such LED drivers.

LED drivers are widely used for powering various types of LED fixtures, including one or more LEDs. Typically, such an LED driver converts a supply voltage to an output voltage (typically a DC voltage) or output current for powering the LEDs of the LED fixture. In general, an LED driver is adapted to accommodate different types of supply voltages, such that it can be applied on different locations, e.g. where different types of supply voltages (e.g. different types of mains voltages) are used.

As an example, an LED driver can be adapted to be supplied with either a 230V, 50 Hz or a 277V, 60 Hz supply voltage. Further, an LED driver typically comprises a galvanic separation between the supply side (receiving the supply voltage) and the load side, where the LED fixture is connected to. To that extent, the LED driver can e.g. comprise a transformer, as e.g. used in a flyback converter. In general, LED lighting provides far more possibilities to generate a particular desired illumination (e.g. with respect to color or intensity), compared to conventional lighting, whereby color and intensity are typically controlled by controlling a current through the LED or LEDs of the LED fixture, i.e. on the load side. In general, it may be advantageous to know the type of supply voltage that is applied, e.g. to adjust or apply a certain control of the LED fixture. Also, it may be advantageous to known about a state of the supply voltage, thus to be able to detect one or more of a frequency, a voltage, an occurrence of voltage spikes, a low power (so called brown out), a power down (so called black out), etc. The derived information about the supply voltage may be applied for various purposes, such as may be taken into account when driving of the LEDs. A characteristic of the supply voltage could be measured by adding measurement circuitry to a primary side of a power converter, such as the flyback converter. This would however on the one hand result in additional cost, and on the other hand would require the LEDs to make use of a power supply that incorporates such additional circuitry, hence making such functionality compatible only with power supplies that incorporate such additional circuitry.

It would be desirable to provide an LED driver whereby a characteristic of a supply voltage can be more easily assessed.

Accordingly, according to an aspect of the invention, there is provided a power converter for supplying an output voltage or an output current for powering an LED fixture from a power supply, the power converter comprising:
  a primary circuit comprising:
    an input terminal for connecting to the power supply;
    a primary winding connected to the input terminal; and
    a switch in series connection with the primary winding to in a conductive state of the switch connect the primary winding to the power supply;
  a secondary circuit comprising
    a secondary winding that is magnetically coupled with the primary winding for providing an alternating voltage in response to a switching of the switch
    a diode connected to the secondary winding to rectify the alternating voltage, and
    a capacitor connected to the diode to buffer the rectifies alternating voltage and provide the output voltage or current
  the power converter further comprising:
    a sensing circuit configured to generate a signal representative of the output voltage of the secondary winding, an edge of the signal representing an edge of the output voltage of the secondary winding in response to the switching of the switch; and
    a detecting circuit configured to derive timing data from the edges of the signal, to estimate a load of the power converter from at least one output parameter of the power converter, and to determine a momentary value of a voltage of the power supply from the timing data and the estimated load of the power converter.

In accordance with the first aspect of the invention, a power converter is provided that is configured to supply an output voltage or current for powering an LED fixture.

In accordance with the present invention, the power converter comprises a primary circuit (having a primary winding) and a secondary circuit (having a secondary winding that is magnetically coupled to the primary winding), whereby the primary circuit is configured to receive a supply voltage (e.g. a mains supply voltage or a rectified mains supply voltage). The supply voltage may also be a DC voltage or a dimmer output voltage as e.g. provided by a triac dimmer or may even be an output voltage of an electronic transformer.

By means of the magnetically coupled primary and secondary winding, the supply voltage may be transformed to an alternating voltage at the secondary winding as the switch alternatingly opens and closes, which is rectified by a rectifier diode and buffered by a capacitor to provide a voltage or current for powering one or more LEDs of an LED fixture.

As the switch switches, i.e. transitions between conductive and non-conductive or vice versa, the primary winding is connected and disconnected from the power supply, and a voltage over the secondary winding of the converter changes as a result of the inductive coupling between the primary winding and the secondary winding. The converter may for example form a switch mode converter, such as a fly-back converter. In accordance with the first aspect of the invention, the power converter comprises a sensing circuit configured to generate a signal representative of a transition, i.e. an edge, of an output voltage of the secondary winding in response to the switching of the switch. The sensing circuit may for example comprise a resistive divider or a clamp circuit. For example, the sensing circuit may provide that the output voltage levels of the secondary winding, associated with the conductive state and the non-conductive state of the switch, are brought into a detection range of measurement electronics, for example in a 0 ... 5 V range, a 0 ... 3V range or any other suitable range. For example, the transition, i.e. the edge, of the output voltage of the secondary winding as a result of the transition of the switch from conductive to non-conductive or vice versa, may result in transition of the signal from low to high level, e.g. 0 to 5 V or vice versa. The power converter further comprises a detecting circuit which receives the signal. The detecting circuit may comprise a data processing device such as a microprocessor. Alternatively, the detecting circuit may comprise a timer or timing circuit.

The detecting circuit may make use of a predefined behaviour of the converter, in that the power supply voltage, the output voltage, the output current and the cycling of the switch are interrelated. The converter, e.g. the flyback converter, may for example operate in Constant Current Mode, CCM, or Transient Current Mode, TM, or Discontinuous Current Mode, DCM. In the case of CCM, the switching frequency remains fixed while the duty cycle of the switching of the switch varies with power supply voltage and output power. Thus, having estimated output power, and knowing the duty cycle, the power supply voltage may be determined. In the case of DCM, a similar approach may be applied. In the case of BCM, both frequency and duty cycle depend on power supply voltage and output power. Thus, having estimated output power, and knowing the duty cycle and the frequency, the power supply voltage may be determined.

The timing data as applied may hence be formed by a frequency of the signal, a duty cycle of the signal or both.

In the case of a varying frequency, such as in BCM, the varying AC mains voltage will result in a varying of the frequency during each AC mains half cycle. In order to measure a peak voltage, the detecting circuit may configured to derive the frequency of the signal at an expected peak of the power supply voltage. The expected peak may be found halfway between the moments in time where the edges in the signal stop, i.e. halfway between the zero crossings of the AC mains voltage.

The load of the converter may be estimated as follows: the detecting circuit may be configured to estimate the load from at least one of the following output parameters of the converter:
an illumination set point of the LED fixture,
an output voltage and an output current of the converter, and
an output voltage of the converter, an LED fixture current and an LED fixture voltage.

The illumination set point, may, making use of an efficiency of the LEDs, be applied to estimate an electrical power provided to the LEDs. Alternatively, a photodetector may be provided to measure the light output, e.g. for all LEDs simultaneously or per colour channel (e.g. Red, Green, Blue, White), and a conversion efficiency being derived therefrom and stored.

Alternatively, the load of the converter may be derived from the output voltage times the output current of the converter.

In case a second converter is applied in a front end converter, back end converter configuration, whereby the converter forms the front end converter and the second converter the back end converter, the efficiency of the back end converter will also effect the power consumption of the front end converter. Thus, either the output voltage and current of the (front end) converter may be applied, or the output voltage of the front end converter, the output voltage of the backend converter and the output current of the backend converter, i.e. the LED current, possibly in combination with an efficiency of the backend converter to calculate the backend converter output power into backend converter input power.

Generally, in the present document, the edges in the signal are detected at a certain moment, the load of the converter being estimated at that moment, and the momentary value of the power supply voltage being determined from the frequency and/or duty cycle and the estimated load, thus to obtain a rather accurate estimation of the momentary power supply voltage, from a signal available at the secondary side.

In an embodiment the frequency and/or duty cycle derived from the signal is converted to an instantaneous mains voltage value using the behaviour of the converter. The behaviour of the fly back converter expressing frequency and or duty cycle in dependency on power supply and load is predetermined by design. This behaviour may be captured in formulas or in tables and stored in the detecting circuit. A microprocessor in the detecting circuit may use the formulas and/or tables in its conversion algorithm. Examples of such properties are the nominal switching frequency and nominal duty cycle of the power converter at each nominal mains voltage that may be presented at the input terminal at e.g. percentages of 100% of the nominal load and 10% of the nominal load (or more percentages of the nominal load) both at the zero crossing of the mains voltage and at the top of the mains voltage. A calibration of the formulas or tables may be part of the factory calibrations.

As an alternate example, curves may be applied, for example curves giving the switching frequency versus load at different nominal mains voltages and frequencies. The curves may be converted to formulas or tables and used in the algorithm for compensating for load and looking up of the mains instantaneous voltage from the derived frequency by interpolating between and extrapolating outside the formulas or tables. Tables and formulas may be defined for e.g. 50, 60, 400 Hz separately.

In an embodiment, the detecting circuit is configured to
detect, from the signal representative of the output voltage of the secondary winding, extremes in at least one of the frequency and the duty cycle of the signal,
derive a periodicity of the extremes from a time pattern of the extremes, and
derive information representative of frequency and timing of the power supply from the periodicity of the extremes and the time pattern of the extremes. Extremes, i.e. highest or lowest values of frequency, duty cycle or any both may be applied: e.g. highest value of frequency and duty cycle, highest value of frequency and lowest value of duty cycle, lowest value of frequency and highest value of duty cycle or lowest value of frequency and duty cycle, e.g. depending on characteristics of the power converter, as explained in more detail elsewhere in the present document. A periodicity may be derived from the occurrence of the extremes, and frequency, e.g. AC mains frequency and timing, e.g. AV mains phase, may be derived from the timing of the extremes, as the periodic occurrence of the extremes may relate to peaks, zero crossings, as described below.

In order to reduce an effect of time jitter, sampling, etc. when attempting to determine an extreme of frequency and/or duty cycle in the signal, averaging may be applied. Accordingly, the deriving the periodicity of the extremes from the time pattern of the extremes may comprise determining times between detected extremes, averaging the times between the detected extremes and deriving the periodicity from the averaged times between the detected extremes.

The extremes may correspond to zero crossings or peak values in the voltage of the power supply.

In case the extremes correspond to zero crossings in the voltage of the power supply, the detecting circuit may be configured to detect a periodic time pattern in the zero crossings of the power supply, mask zero crossings in synchronism with the periodic time pattern, and detect remaining time periods in which the power supply subceeds a low voltage threshold from the at least one of the frequency and the duty cycle of the signal. The low voltage threshold may be a constant threshold or a time variable threshold that follows a nominal waveform of the AC mains, thus to raise the threshold as the power supply voltage raised and vice versa during the AC time cycle.

For example, overvoltage of the power supply voltage may be detected, Thereto, in an embodiment, the power converter is configured to respond to an overvoltage of the power supply by stopping the switching, the detecting circuit being configured to signal an overvoltage condition when the signal representative of the output voltage of the secondary winding stops switching.

As another example, undervoltage may be detected. Thereto, in an embodiment, the power converter is configured to respond to an undervoltage of the power supply by stopping the switching, the detecting circuit being configured to signal an undervoltage condition when the signal representative of the output voltage of the secondary winding stops switching.

A time during which the signal stops switching may be indicative of a spike, surge, brown out, in case of part of a mains frequency cycle, e.g. a part of the time period between successively masked zero crossings, or black out, e.g. a stopping of the switching longer than the time period between successively masked zero crossings.

The above detection of overvoltage or undervoltage from the stopping of the switching may be combined with masking of zero crossings, and the detection of overvoltage or undervoltage from the stopping of the switching being performed outside the masked zero crossings, in particular in case the power converter is configured to stop switching or reduce the frequency of the switching at the zero crossings, thus to be able to distinguish between zero crossings and other phenomena having influence on the switching of the signal.

In order to detect a peak voltage of the power supply, the detecting circuit may be configured to detect extremes of frequency and/or duty cycle that relate to a highest voltage, estimate the load of the converter at the moment of the extremes, and determine the momentary value of the power supply voltage from the frequency and/or duty cycle and the estimated load.

Thus, a maximum voltage may thereby be detected. The maximum voltage may be compared to an overvoltage threshold respectively an undervoltage threshold, the thresholds e.g. being set outside of a mains voltage tolerance band of the power supply, in order to be able to detect overvoltage resp. undervoltage as applicable. Similarly, the extremes may relate to the zero crossing, enabling to detect the zero crossings therefrom.

An operation mode, e.g. Constant Current Mode, CCM, or Transient Current Mode, TM, or Discontinuous Current Mode, DCM, may be derived from the behaviour of frequency and phase of the signal. The modes make use of fixed ON times or variable ON times (VOT) or fixed or variable frequency. The duty cycle can be calculated from successive transitions of the signal. In the case of CCM as well as DCM, the switching frequency remains fixed while the duty cycle of the switching of the switch varies with power supply voltage and output power. In the case of BCM, both frequency and duty cycle depend on power supply voltage and output power.

Further details and formulas which may be applied to derive what type of control mode is applied by the converter, are provided below. Hence, in case the behaviour of the converter is unknown, for example because of it being sourced from another supplier, or because various types of converters may be applied, the mode may be derived from the behaviour of frequency and/or phase of the signal as the power supply voltage varies, e.g. during an AC mains voltage cycle. Hence, compatibility with various power converter types/modes etc. may be provided, even if the behaviour/type is not known beforehand. This may be particularly useful in a front end back end converter scenario, whereby the back end converter receives the signal (possibly comprises sensing circuit and/or detecting circuit) and hence may cooperate with various front end converter types.

In case an undervoltage is detected and the undervoltage exceeds a predetermined duration, the LEDs may be driven at a power failure setting, e.g. a low light output to save power, or a signalling e.g. a blinking, e.g. in a particular colour, e.g. red to signal that an error has occurred. Similarly, in particular in the case of overvoltage, the converter may be switched off if the overvoltage exceeds a predetermined duration Data concerning the power supply voltage, e.g. data concerning overvoltage, undervoltage, peaks, glitches, spikes, brown outs, etc. may be stored in a memory of the detecting device or a memory accessible to the detecting device. Alternatively, or in addition thereto, the data concerning overvoltage, undervoltage, peaks, glitches, spikes, brown outs, etc. may be transmitted to a remote server, for example to a remove data logging server that logs data transmitted by the converter. Hence, in case of the occurrence of errors that may have an impact on service life and/or performance of the power supply or a driver of which it forms part, a signalling may be provided to service technicians and corrective actions may be initiated to address the detected power supply problem.

The sensing circuit may connect to the secondary winding, e.g. comprising a voltage divider, a voltage shifting circuit and/or a clamping circuit. The sensing circuit may connect to the secondary winding. Alternatively, the sensing circuit may comprising a further winding (e.g. an auxiliary winding), that is magnetically coupled to the first and second windings. In accordance with the present invention, the measured electrical characteristic is used to determine an electrical characteristic of the supply voltage. As will be explained in more detail below, when information about the supply voltage (e.g. frequency, amplitude AC or DC, brown out, black, out, spikes, etc.), is available on the secondary side, this may facilitate the control of the LED or LEDs of the LED fixture that is powered. Having knowledge about the type of supply voltage that is used to power the power converter may also enable an increased functionality in the controlling of the LED or LEDs, or may cause change in behaviour of the driver.

In an embodiment, the signal representative of the output voltage of the secondary winding is a binary signal. The sensing circuit is configured to derive a binary signal representative of the output voltage of the secondary winding, the sensing circuit being configured to transition a level of the binary signal in response to a transition of the output voltage. Thus, a binary, i.e. two level signal is obtained, whereby the transition of the output voltage of the secondary winding as a result of the switching of the switch from conductive to non-conductive or vice versa, provides for a transition of the signal from low to high or high to low. Hence, timing information about times of occurrence of the transitions may be derived from the binary (two level) signal. The signal may accordingly be provided to a digital processing device, digital timer, etc. Hence, the detecting device may be implemented by a microprocessor, microcontroller, or similar hardware, receiving the binary signal at an input thereof.

In an AC waveform, zero crossings of the power supply voltage form a repetitive pattern. At or near the zero crossing, the power supply voltage may get too low for the converter to operate, hence the converter may stop switching. The frequency of the mains may be derived from times between such periods where the converter stops switching, the periods where no transitions are detected. The time of occurrence of the periods where the converter stops switching indicates the time of occurrence of the zero crossings. Thus, the detecting device may derive mains frequency and phase information.

Some embodiments below relate to a converter that stops switching when the power supply voltage gets too low, i.e. at zero crossing, for example rIn an embodiment, the detecting circuit is configured to
    detect a periodic time pattern in the zero crossings of the power supply, and
    mask zero crossings in synchronism with the periodic time pattern, and
    alert remaining time periods in which the signal representative of an output voltage of the secondary winding remains the same.

Thus, the zero crossings of the AC waveform, once frequency and timing is known, can be masked by masking the periods at the repetition rate in accordance with the mains frequency. Any stopping of the switching of the converter in between these zero crossings may have other causes, and may indicate a brown out, glitch, or other phenomena.

In an embodiment, the detecting circuit is configured to
    drive the LEDs at a power saving setting in response to signalling the undervoltage.

The power saving settings may for example result in a reduced intensity of the LEDs, hence reducing a power consumption so as to accommodate to a low power condition of the power supply.

In an embodiment, the detecting circuit is configured to
    establish if a time duration of the blank time period in which transitions of the signal (i.e. edges of the signal) remain absent, exceeds a predetermined duration, and
    drive the LEDs at a power failure setting in response to signalling the time duration of the blank time period exceeds the predetermined duration. An action can be taken when the duration takes longer than e.g. the energy buffered in the driver lasts given the current load: actions can be to switch of light after a certain time; to dim the light to a configured minimum and eventually switch it off. Immediately prior to switching of and/or during the dim duration pulsed light of a different colour may be radiated to signal the user the cause of the a-typical condition.

In an embodiment, the detecting circuit is configured to transmit data concerning the blank time periods to a remote server.

When there is no switching at all the mains may be completely gone, i.e. a power interruption. The duration of the interruption may be measured as the duration of the absence of pulses. Based on the duration, signalling (to the user or some system management) and reporting can be done and statistics can be done over a longer period of time. Statistics may include number of interruptions, duration versus number of occurrences graphs. Simple statistics may be done on the driver, for example count the number of occurrences over driver lifetime, over last power-up session, over last day, week, month when the driver is aware of time/calendar. More complex statistics are typically done "in the cloud", that is for example in the network on a server.

In an embodiment, the detecting circuit is configured to derive timing data from the edges of the signal, to estimate a load of the power converter, and to determine an electrical characteristic of the power supply from the timing data and the estimated load of the converter.

In an embodiment, the blank time periods are detected in repetition periods of an alternating current repetition rate of the power supply.

According to a second aspect of the invention, there is provided an LED driver circuit for driving an LED fixture, the LED driver circuit comprising
    the power converter according to the invention, and
    a back end converter having an input connected to the secondary circuit of the power converter and having an output connected to the LED fixture,
    wherein the back end converter comprises a back end converter controller configured to control a switching of the back end converter, and wherein the detecting circuit is implemented by the back end converter controller.

The converter as described above may be advantageously used in the context of a front end-back end converter setup, whereby the above described converter according to the invention is employed as the front end converter. Hence, the information relating to the power supply (zero crossings, surges, brown out, etc.) may be obtained by the back end converter using simple hardware, namely from a secondary side of the front end converter. Therefore, additional galvanic separation may be omitted and additional hardware at the primary side of the front end converter may likewise be omitted. Also, as the sensing circuit and detecting circuit connect to the secondary side of the front end converter, they may easily interface with the back end converter, in particular with the controller thereof. For example, the detecting circuit may be comprised in the controller (e.g. microprocessor) of the back end converter. The backend converter may hence adjust an illumination based on measured properties of the power supply, for example adjust the light output and/or colour in the case of a low power, brown out, etc. Also the backend converter may adjust a time modulation of the LEDs, for example in synchronism with a cycle of the power supply.

These and other aspects of the invention will be more readily appreciated as the same becomes better understood by reference to the following detailed description and considered in connection with the accompanying drawings in which like reference symbols designate like parts.

FIG. 1 schematically depicts a power converter according to an embodiment of the present invention.

FIG. 2 schematically depicts a power converter according to another embodiment of the present invention.

FIG. 3 depicts an LED fixture and an LED driver for controlling a current supplied to the LED driver, including a secondary circuit of a power converter according to the present invention.

FIGS. 4a, 4b, 5, 6 schematically show various sensing circuits as can be applied in a power converter according to the present invention.

FIGS. 4c and 4d depict waveforms of the signal as may be obtained using the sensing circuits.

FIG. 7a-f depicts a time diagrams based on which an aspect of the invention will be further explained.

FIGS. 8a-g depict time diagrams based on which an aspect of the invention will be further explained.

FIG. 9 depicts time diagrams based on which an aspect of the invention will be further explained.

FIG. 10a-c depict time diagrams to illustrate varying frequency and/or duty cycle during an AC mains half cycle resp. cycle.

Figure 1:
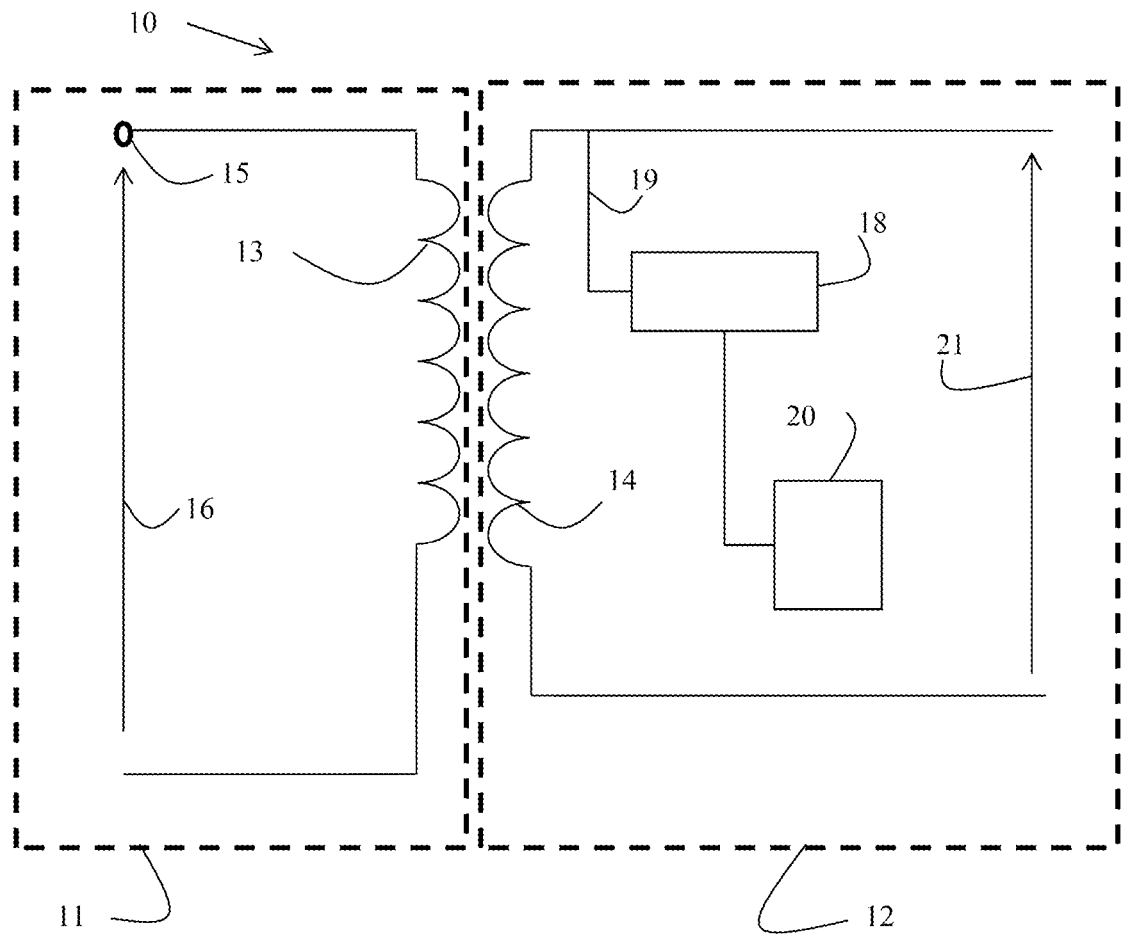

FIG. 1 schematically depicts a power converter 10 comprising a power converter having a primary circuit 11 and a secondary circuit 12, comprising a primary 13 respectively secondary winding 14 that are magnetically coupled (thus forming a transformer 13,14). Optionally, the primary circuit and the secondary circuit are galvanically separated. The primary circuit 11 further comprises an input terminal 15 for receiving a supply voltage 16, e.g. an AC mains voltage. The secondary circuit 12 as shown further comprises a sensing circuit 18 for sensing an electrical characteristic of the secondary circuit 12. In the embodiment as shown, the sensing circuit 18 is arranged to determine an electrical characteristic of the secondary winding 14 of the secondary circuit 12 (as schematically indicated by the line 1). As an example, the sensing circuit 18 can be arranged to measure the voltage over the secondary winding 14 or the current through the secondary winding 14. In accordance with the present invention, the sensor 18 need not determine an electrical characteristic of the secondary winding 14, but may also determine an electrical characteristic of another component of the secondary circuit as well. As an example (see also further on), the secondary circuit 12 can be provided with an auxiliary winding (not shown in FIG. 1) that is magnetically coupled with, and optionally galvanically separated from the primary winding 13. In such embodiment, the sensing circuit 18 can be arranged to determine an electrical characteristic (e.g. a voltage or current) of the auxiliary winding.

The sensing circuit may also be referred to as sensor, and the detecting circuit may also be referred to as detector.

The primary circuit and the secondary circuit of the power converter may be configured as a flyback converter. A flyback converter is often used as a power converter for an LED fixture because it applies, compared to a buck or boost converter, a transformer instead of a mere inductance, thus enabling to provide a galvanic separation between a primary side and a secondary side and, if required, a scaling of the supply voltage (provided on the primary side) to the output voltage (on the secondary side), the output voltage being applied to power the LED fixture. In general, a flyback converter as applied comprises a primary circuit and a secondary circuit, comprising a primary, respectively secondary winding, the windings being magnetically coupled and galvanically separated. The primary circuit of the flyback converter may be provided with a rectifier (e.g. a full bridge or half bridge rectifier) in case of an AC supply voltage (such as a mains supply voltage) and a switch, e.g. connected in series with the primary winding, whereby the switch is typically controlled to operate at a switching frequency e.g. ranging between 80 and 1000 kHz, during operation. In case of the application of a rectified AC supply voltage, the primary circuit of the power converter may also include a buffer capacitor.

The supply voltage as applied to the input terminal of the power converter may e.g. be or be derived from a 230V, 50 Hz mains supply or a 277V, 60 Hz mains supply. In case of a flyback converter or an electronic transformer, the supply voltage may also be a DC supply voltage, which is, by means of the coupled primary and secondary circuit, transformed to a suitable level for powering an LED fixture or a further converter such as a Buck or Boost converter.

Figure 2:
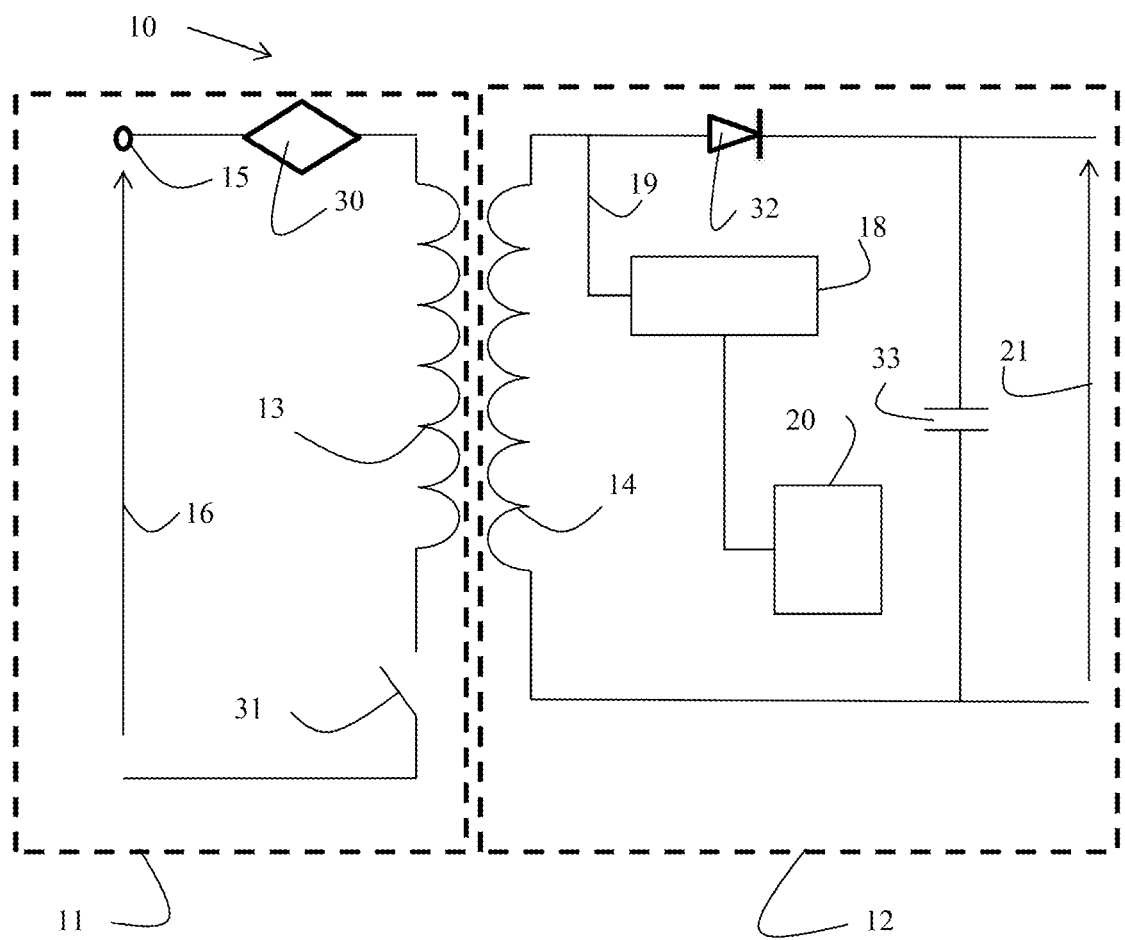

In FIG. 2, another embodiment of a power converter according to the present invention is schematically shown. In the embodiment, the power converter is configured as a flyback converter. Compared to the embodiment of FIG. 1, the primary circuit 11 is further provided with a rectifier 30 (e.g. a full bridge or half bridge rectifier) for rectifying the supply voltage 16 (e.g. an AC mains voltage). The primary circuit 11 further comprises a switch 31 (e.g. a power FET) for connecting/disconnecting the primary winding 13 of the transformer (13,14) with the supply voltage 16. During use, the switch is e.g. controlled by a standard flyback regulator. The secondary circuit of the flyback configuration is provided with a biasing diode 32 and a buffer capacitance 33. By controlling the switching of switch 31, the output voltage 21 of the secondary circuit 12 can be controlled.

Figure 3:
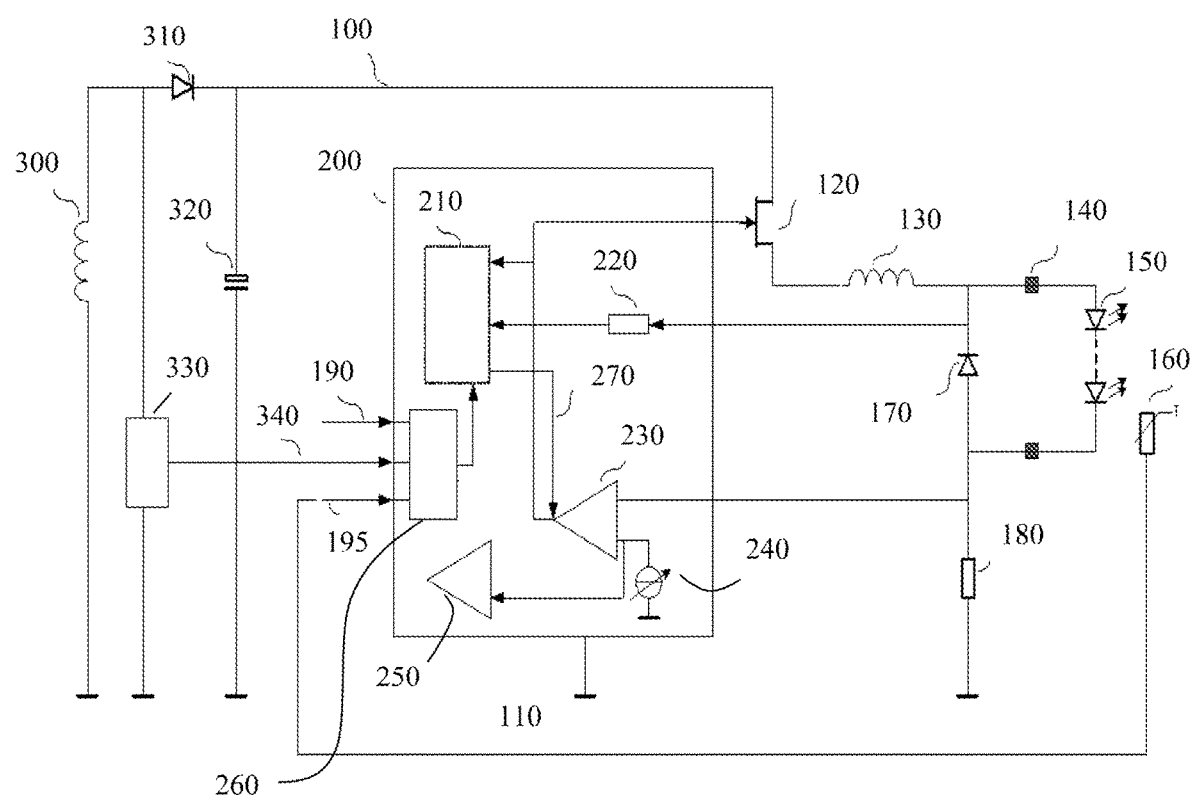

In FIG. 3, a more detailed embodiment of a secondary circuit as can be applied in a power converter according to the present invention is schematically shown, including an LED fixture 140,150.

In FIG. 3, a sensor 330 is schematically shown that transforms the voltage across the secondary winding 300 into a signal 340 that is provided to an input terminal 260 of a microcontroller 200. The microcontroller 200 comprises a processing unit 210 which can operate as a detector for determining an electrical characteristic of the primary winding (not shown).

In an embodiment, signal 340 can for example be a scaled down copy (scaled down by the sensor 330) of the voltage across the secondary winding 300, scaled down to fit the range of the input terminal 260. The signal may subsequently be converted to a digital signal by an A/D converter, e.g. provided in the input terminal 260. The digital signal may then be provided to the processing unit 210 where it is processed to derive an electrical characteristic of the supply voltage as supplied to the primary winding. As an example, the processing unit 210 may be adapted to detect (a pattern of) edges in the digital signal as provided. Such counting can, as an example, be implemented in software or by using an internal hardware counter of the processing unit 210.a1 can be counted, either in SW or by an internal HW counter in the uC. In another embodiment, the input terminal 260 is an analogue input supplying the signal 340 to an analog input of the processing unit 210 where the signal is e.g. sampled. The sampled signal may then be processed using the software available on the processing unit 210 to determine electrical characteristics of the supply voltage such as a switching frequency of the power switch (such as switch 31 of FIG. 2) or an envelope of the supply voltage which can be used to derive a main frequency (e.g. 100 or 120 Hz) of the supply voltage.

In another embodiment, the voltage across the secondary winding may be clamped and the clamped voltage is fed to a digital input of the processing unit 210 and processed using an internal hardware counter, or sampled in an analogue sense and characterized using the processing unit's software.

As an alternative to processing a signal representative of the voltage across the secondary winding 300, a signal representative of the current through the secondary winding, e.g. derived from a voltage across a small measuring resistor in series with the winding or via another current measuring method, may be applied as well for determining an electrical characteristic of the supply voltage.

FIG. 3 further schematically depicts a converter for controlling a current as supplied to the LED fixture 140, 150. In the embodiment shown, the converter comprises a switch 120, an inductance 130 and a freewheeling diode 170. By means of resistance 180, a signal may be derived (i.e. the voltage over resistance 180) which is representative of the current supplied to the LED fixture, the signal may be provided to a comparator 230 where the signal is compared to a variable voltage 240 which may be set in accordance with a desired set point. In an embodiment, an electrical characteristic of the supply voltage is determined using an electrical characteristic of the secondary circuit and a load characteristic. As an example of the latter, the current as supplied to an LED fixture or a forward voltage over an LED fixture can be mentioned.

In the following figures, different types of sensor/detector combinations are discussed which may be applied in the power converter according to the present invention. These different types of sensor/detector combinations are applied on the secondary circuit of the power converter according to the present invention and enable to determine one or more electrical characteristics of the supply voltage provided on the primary side, based on measured electrical characteristics on the secondary side.

Figure 4A:
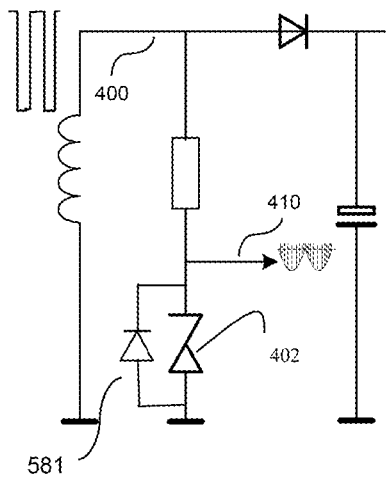
Figure 4B:
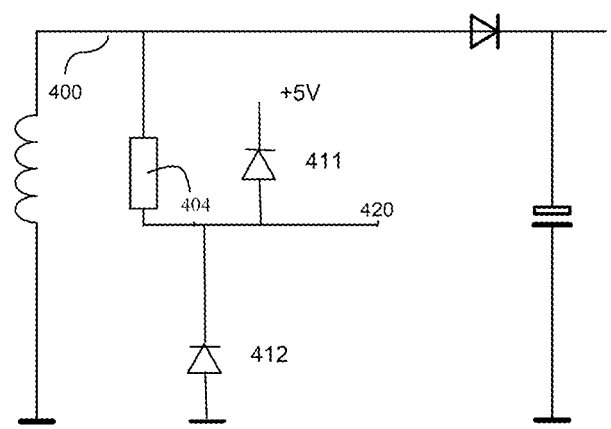
Figure 4C:
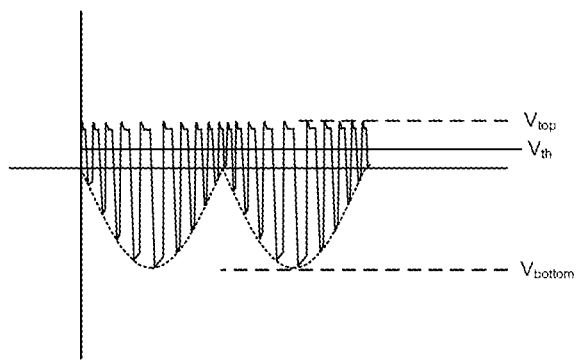

FIGS. 4a and 4b schematically show analogue circuits which can be applied as sensing circuits in the present invention. Reference number 400 represents a voltage over either the secondary winding or an auxiliary winding of the secondary circuit. In the embodiment as shown, a switching operation at a switching frequency (e.g. using a switch such as switch 31 of FIG. 2) is assumed, as can be seen from signal 410 which is derived from the voltage 400. FIG. 4c shows in more detail the voltage 410 over diode 402, which can be used as an input signal for a detector, not shown. In the example as shown, the signal 410 is typical in case of an AC supplied flyback converter, as e.g. described in FIG. 2. The switching behavior of the switch of the flyback converter can be observed in the secondary voltage 400, i.e. the voltage across the secondary winding or across an auxiliary winding of the secondary circuit. Further, using a comparison between the voltage 410 and a voltage Vin as shown, the switching behavior of the switch can be determined, and thus the switching frequency can be determined. In case only the edges of the signal are considered, i.e. in case only the transitions of the secondary voltage as result of the switching of the switch are considered, diode 408 may provide a clamping to remove negative voltage excursion of the signal. Hence, a signal is provided having two levels, namely a positive level defined by diode 402 and a near zero level defined by diode 408. Information about the power supply may be derived from the edges of the signal, and/or the absence thereof.

In an embodiment, the detector may comprise an analogue detection circuit to e.g. determine an amplitude of the signal. As an alternative, a digital detection circuit may be applied. In the latter case, a signal representative of either the voltage or current associated with the secondary circuit may e.g. be sampled and processed using a microprocessor or the like, in order to determine an amplitude and/or frequency of the supply voltage on the primary side. In case the primary circuit comprises a switch (e.g. in case the power converter is a flyback converter or an electronic transformer), the switching frequency may be determined as well from the sampled signal by the microprocessor.

Figure 4D:
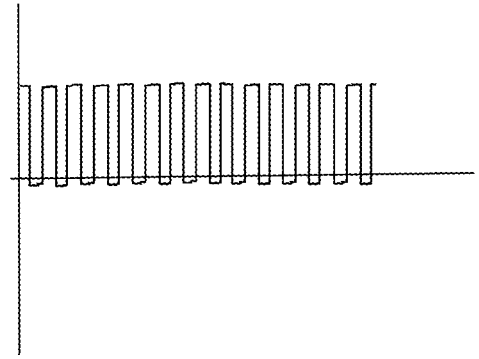

A compact, low cost realisation may be achieved using a digital detecting circuit such as a timer, whereby the signal provides a binary, i.e. a binary level signal to the detecting circuit, such as using the diode 408 in FIG. 4a, resulting in waveform of the signal as depicted in FIG. 4d, reflecting a binary level signal between around 0V and around a clamping voltage of diode 402. The digital detecting circuit may detect transitions, i.e. edges in the signal, and the timing thereof, as described in more detail below. The digital detecting circuit may for example be implemented by a timer of a microcontroller.

FIG. 4b schematically shows another sensing circuit including resistor 404 and (zener) diodes 411, 412 connected between the one terminal of the resistor 404 and ground respectively 5V (or other logic supply voltage), so as to clamp the signal 420 to levels around logic low and logic high levels. Again, a compact, low cost realisation may be achieved using a digital detecting circuit such as a timer, whereby the signal provides a binary, i.e. a binary level signal to the detecting circuit, similar to the signal depicted in FIG. 4d. The digital detecting circuit may detect transitions, i.e. edges in the signal, and the timing thereof, as described in more detail below.

Figure 5:
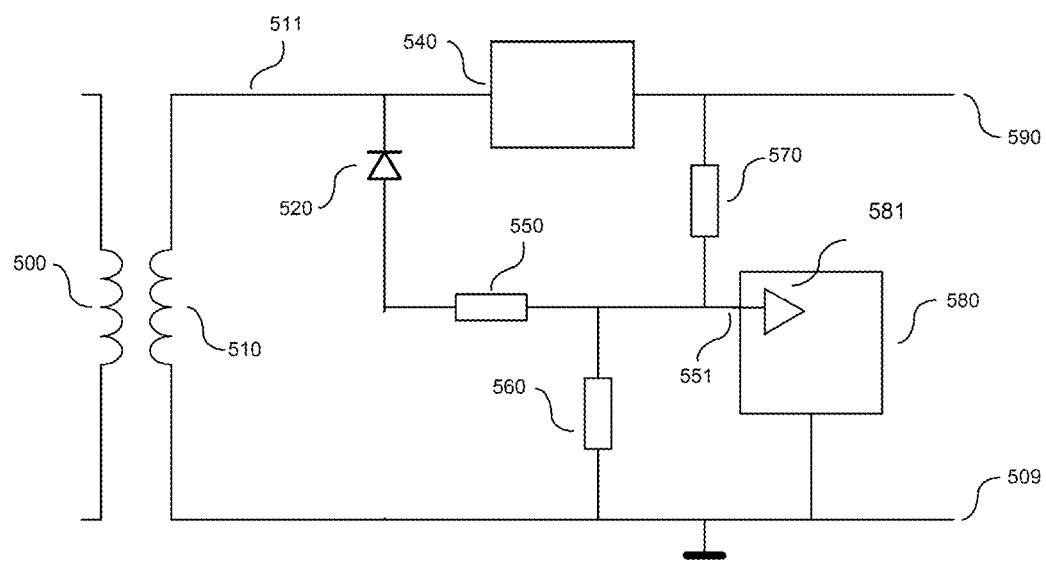
Figure 6:
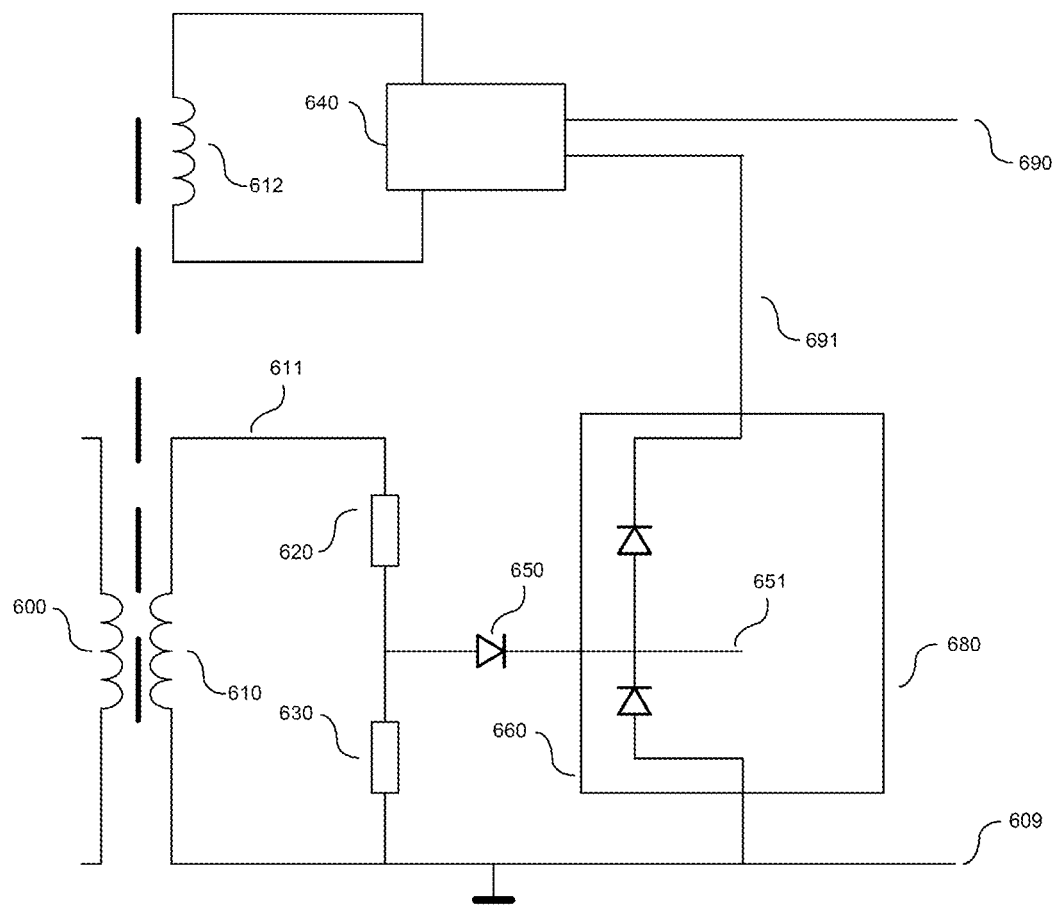

In FIG. 5, yet another sensing circuit is shown which can be applied to sense or measure an electrical characteristic of the secondary circuit of the power converter. FIG. 6 schematically shows a primary winding 500 of the primary circuit and a winding 510 of the secondary circuit. Voltage 511 over the winding 510 is brought, in an amended form 551 to a terminal of detector 580, which can e.g. include a microprocessor or the like to derive an electrical characteristic of the supply voltage applied on the primary side, e.g. over winding 500. As shown, a voltage divider circuit including diode 520 and resistors 550, 560 and 570 are used to convert the voltage 511 to the input voltage 551 of the detector 580; resistors 550 and 560 can be applied to appropriately scale the voltage, e.g. between −5 and 0 Volt, whereas resistor 570 acts as a pull-up resistor to pull up the voltage to a voltage between 0 and 5 V. In the arrangement as shown, the detector comprises a comparator 581 which converts the analogue waveform into a binary signal. Thereto, the comparator may be provided with a suitable, reference, such as a reference in between the levels 0 and 5V, e.g. using a resistive divider or other reference, possibly in combination with some hysteresis to prevent bouncing of the signal as a result of noise or other disturbances. The hysteresis may be provided by some degree of positive feedback from output to input of the comparator.

In FIG. 6, yet another sensor or sensing circuit is shown as can be applied in a power converter according to the present invention. In the embodiment as shown, a primary winding 600 is magnetically coupled with a secondary winding 612 and an auxiliary winding 610, the auxiliary winding enabling a characterization of the mains supply: A voltage 611 over the auxiliary winding 610 is applied to a detector 680, typically a microcontroller, a microprocessor or the like. The voltage 611 over the auxiliary winding is applied, via voltage divider 620, 630 and diode 650 to an input 651 (e.g. a digital input pin of the detector 680). Voltage divider 620, 630 may e.g. be an impedance divider (typically consisting of resistors) to match the voltage 611 to a range that is acceptable by the detector 680. In the circuit as shown, diode 650 is applied to pull the voltage on input 651 high and not low. A resistor 660 is applied to pull the voltage on input 651 down when diode 650 is not conducting. Note that resistor 680 may be external or internal to the detector 680. FIG. 6 further shows a pair of limiting diodes 670, 671 to keep the voltage on input 651 substantially within the range acceptable to the input pin 651. In case the input pin 651 is a digital input pin of the detector or microcontroller 680, a counter in the microcontroller may then be applied to detect edges occurring on input 651 during a certain period.

FIG. 7A depicts an AC mains 700 exhibiting a sinusoidal waveform as may be applied as a power supply for the circuits described with reference to FIG. 1-6. An output voltage of the secondary winding is schematically depicted by 701. In accordance with the switching of the switch of the converter, the output voltage of the secondary winding alternates between the output voltage of the converter and a low level, whereby the excursion towards the low level depends on the momentary value of the mains voltage. Thus, the larger a momentary value of the mains voltage, the larger a voltage swing at the secondary winding will be, the voltage swing in response to a transition of the switch from conductive to non-conductive or vice versa. Using a comparator (possibly with hysteresis), clamping, or similar as described with reference to any one of FIGS. 1-7, a signal 702 may be derived. Signal 702 is a binary signal having a high and a low level. The edges in the signal 702, i.e. the transitions between the levels, reflect the transitions of the voltage at the secondary winding as a result of the switching actions of the switch of the converter. As seen in FIG. 7b, at or around the zero crossings of the mains voltage, i.e. where the mains voltage changes polarity, the excursion of the voltage 701 at the secondary winding reduces. As a result, around the zero crossings, the excursion of the voltage 701 is too low to make the signal 703 to switch to the other one of the binary levels, hence the signal 703 temporarily stops the periodic transitions. For example, a mains frequency may be derived from the time between the periods where the edges of the signal, i.e. the toggling of the signal stops.

As another example, a periodicity of the periods where the toggling of the signal repetitively stops, may be applied as a mask 707, as depicted in FIG. 7e. Accordingly, other time periods where the toggling stops may be distinguished. A brief time period 708 between the masked time periods may originate from a sag 705. A longer time period 709 between the masked time periods may indicate the occurrence of a sag 706. A time period longer than the masked time periods may be indicate of a power failure, a brown out or a black out. In case the converter is configured to stop the operation on/off switching of the switch in case the power supply voltage gets too high, a too high mains voltage may be recognized as an absence of the edges in the signal at a peak of the sinusoidal power supply voltage, namely an absence timewise between the masked periods, thus timewise in between the zero crossings.

FIGS. 8A-G depict similar waveforms as in FIGS. 7A-F, whereby in FIGS. 8A-G the frequency of the signal increases when the power supply voltage lowers. Thus, as the zero crossings, the frequency of the signal shows its highest value, and the tops of the sinusoidal curves resp. the peaks, the frequency of the signal shows its lowest value. Reference numbers 800-809 hence correspond, mutatis mutandis, to reference numbers 700-709. Likewise the description to FIGS. 7A-F applies to FIGS. 8A-G, mutatis mutandis.

Figure 9:
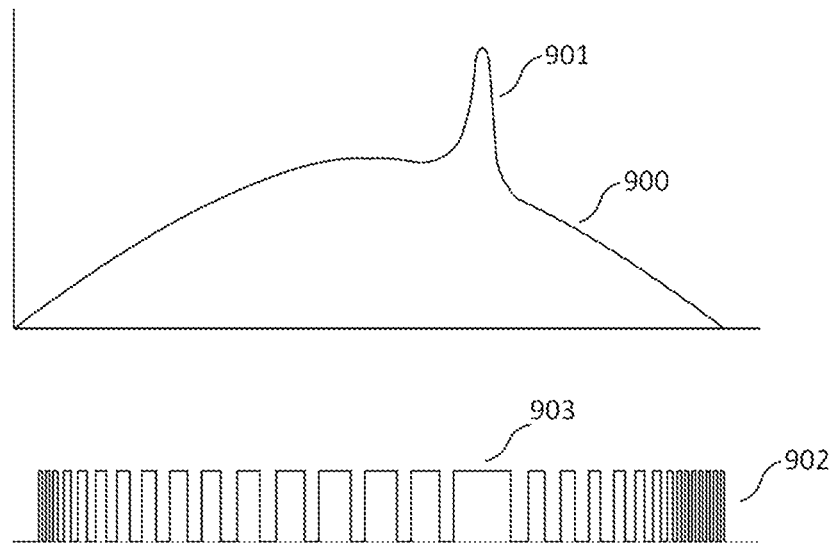

FIG. 9 depicts an overvoltage spike 901 in the AC mains voltage 900, the overvoltage causing a frequency of the switching to decrease, whereas at the zero crossings 902, the frequency of the switching increases In case a problem with the power supply is established, e.g. a brown out, low voltage, too high voltage, etc. the detecting device may drive the LED fixture to signal such event to the user, e.g. by reducing intensity, blinking at a predetermined colour to signal an error, etc. Likewise, a message may be transmitted to a remote server, e.g. for remote maintenance, logging, etc.

The timing, i.e. repetition frequency of the edges in the signal and/or the duty cycle of the signal may vary, as the switching frequency and/or duty cycle of the converter may vary. Accordingly information may be derived from the switching frequency as follows.

The converter may operate in different modes, e.g. a Constant Current Mode, CCM, or Transient Current Mode, TM, or Discontinuous Current Mode, DCM.

In the case of CCM, the switching frequency Freq remains fixed while the duty cycle Ton of the switching of the switch varies with power supply voltage and output power, in accordance with the below table 1, wherein Vpower=Vpower supply-RMS in Volts and Pout=load in Watts.

TABLE 1

| Mode = CCM | Freq | Ton |
| --- | --- | --- |
| Vpower higher | fixed | lower |
| Vpower lower | fixed | higher |
| Pout higher | fixed | higher |
| Pout lower | fixed | lower |

In particular, the duty cycle, Ton/T may be defined by (1) as $$\frac{TON}{T} = \frac{NP/NS(VO + VD1, on)}{(VDC - VQ1, on) + NP/NS(VO + VD1, on)} \quad (1)$$

wherein Np and Ns being the primary and secondary winding numbers, VDC being the Vpower supply rectified peak, Vo being the converter output voltage, VD1 being the converter output rectifier diode forward voltage, VQ1, on being the primary side switch ON voltage.

In the case of DCM, a similar approach may be applied: The switching frequency Freq remains fixed while the duty cycle Ton of the switching of the switch varies with power supply voltage and output power, in accordance with the below table 2, wherein Vpower=Vpower supply-RMS in Volts and Pout=load in Watts.

TABLE 2

| Mode = DCM | Freq | Ton |
| --- | --- | --- |
| Vpower higher | fixed | lower |
| Vpower lower | fixed | higher |
| Pout higher | fixed | higher |
| Pout lower | fixed | lower |

In particular, the duty cycle, Ton resp. Toff may be defined by (2) as $TON$ formula: $D=(1/V_i(N_s/N_p))*\mathrm{sqrt}(2P_{out}L_{sec}f)$ $TOFF$ formula: $D2=(1/V_{out})*\mathrm{sqrt}(2P_{out}L_{sec}f)$ $T=TON+TOFF; f=1/T=\mathrm{fixed}$ \quad (2)

wherein Np and Ns being the primary and secondary winding numbers, Vi being the Vpower supply voltage, Vout being the converter output voltage, Pout being the converter output power, Lsec being the secondary winding inductance, f being the converter switching frequency, D being the ON duty cycle and D2 being the OFF duty cycle.

In the case of BCM, both frequency and duty cycle depend on power supply voltage and output power in accordance with the below Table 3:

TABLE 3

| Mode = BCM | Freq *) **) | TON ***) |
|---|---|---|
| Vmains higher | lower | lower |
| Vmains lower | higher | higher |
| Pout higher | lower | higher |
| Pout lower | higher | lower |

Ton, Toff, Tres and f may be defined as by (3) follows:

$$T_{ON}=2LP_{out}/(\eta V^2_{in,rms})$$

$$T_{OFF}=V_{in}(t)/V_{out}-V_{in}(t)*T_{ON}$$

$$T_{res}=\pi*sqrt(L\ C_{res})=\text{constant when design is finalized.}$$

$$f=1/T=1/(T_{ON}+T_{OFF}+T_{res}) \quad (3)$$

wherein Ton and Toff being the ON and OFF times respectively, Tres being a remaining, constant time of the cycle, Vi being the Vpower supply voltage, Vout being the converter output voltage, Pout being the converter output power, L being a winding inductance, f being the converter switching frequency.

For the BCM table above it is assumed that Tres is measured until the first valley in the voltage across the secondary winding where the switch is switched ON again. It is noted that the control strategy may also use valley hopping in which 2nd, 3rd etc valley is chosen to start TON again. This lowers the frequency while no more energy is transferred and is therefore used at (very) low loads. When the FED signal is coupled into the processor, without the oscillation with the valleys crossing the digital threshold of a digital input port, the oscillations are not seen and either the TON or the TOFF is seen longer by the microprocessor by the amount of Tres plus 1 or more oscillation periods.

The control strategy with BCM can have a constant ON time (COT) or a variable ON time (VOT). As this is typically chosen during design and therefore fixed for a certain embodiment, this knowledge may help to make the analysis in software of the FED signal simpler.

Hence, using the above examples of CCM, DCM and BCM, a relation between the timing of the switching, i.e. the timing of the edges in the signal provided by the sensing circuit, the power supply voltage and the output power is known. Thus, using the output power and the timing of the switching (frequency, duty cycle or both, as applicable) as input, the power supply voltage may be estimated. To do so, the detecting circuit may make use of a suitable formula or look up table.

Figure 11:
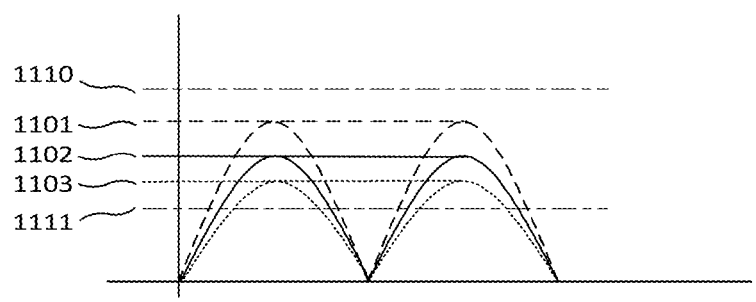
FIG. 11 depicts various power supply mains levels based on which an aspect of the invention is explained.

FIG. 11 depicts a rectified, sinusoidal AC mains, having a nominal peak level 1102 and tolerance band 1103, 1101, expressing a tolerance band (min, max) of the peak value. Thresholds 1111, 1110 may be applied by the detecting circuit to compare the momentary peak value against, and to provide signal an undervoltage resp. an overvoltage in case the threshold is subceeded resp. exceeded.

Data concerning accumulated consumed energy (or power) of the power converter may be logged in a memory of the detecting circuit. Thereby the real value of the power supply voltage as derived from the switching of the signal and the load of the converter, may be taken into account. For example, the effective value of the power supply voltage may be derived (e.g. by dividing the peak value of the voltage, as obtained above, by the square root of two), and taken into account when calculating the energy (or power) consumption, thus to avoid that a high or low mains voltage would result in a too low or too high estimated power consumption.

Figure 10A:
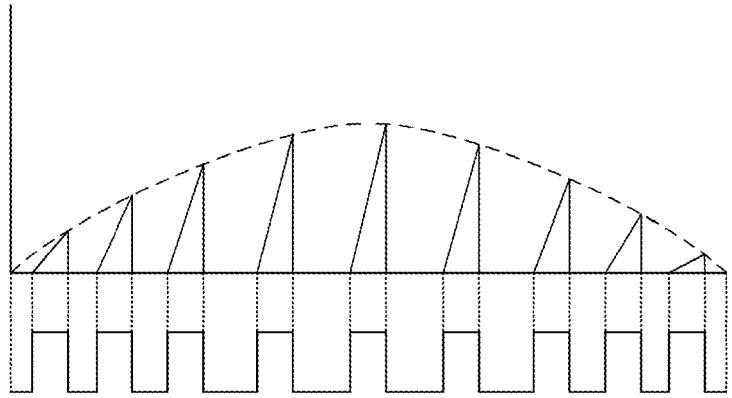
Figure 10B:
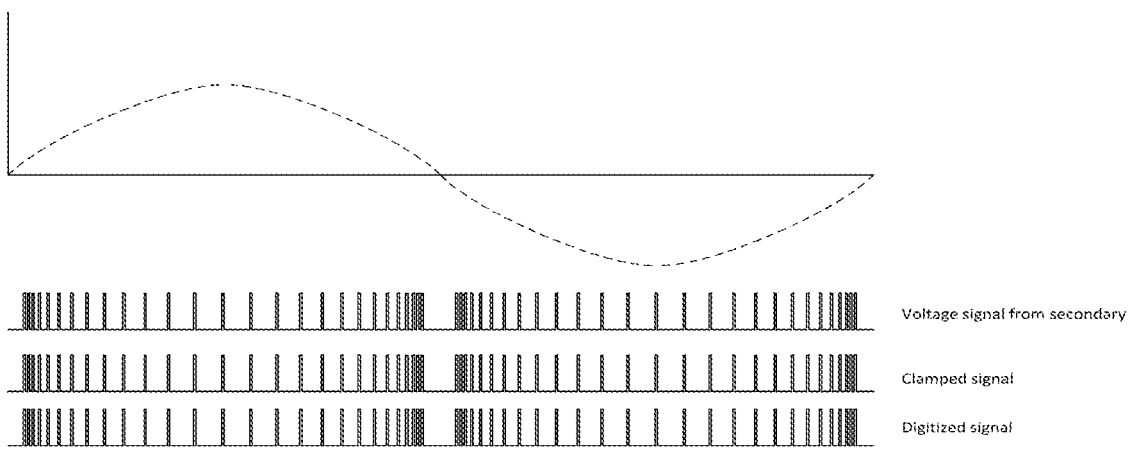
Figure 10C:
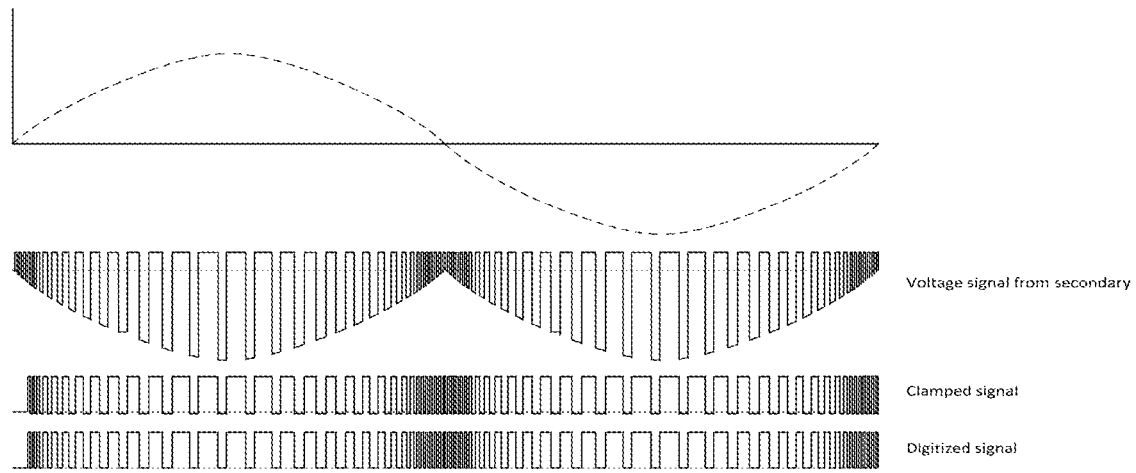
Figure 12:
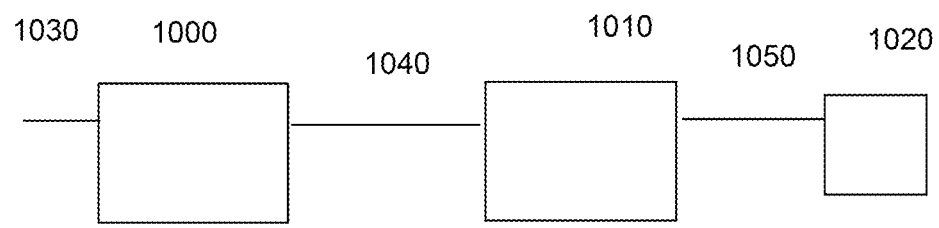
FIG. 12 depicts a highly schematic view of a front end converter-back end converter setup.

In the case of a varying frequency/and or duty cycle, such as in CCM, DCM or BCM, the varying AC mains voltage will result in a varying of the frequency and/or duty cycle during each AC mains half cycle. FIG. 10A depicts an example of a constant ON time CRM/BCM/TM controller showing a higher frequency near zero crossing. FIG. 10B depicts an example of CRM constant duty cycle, variable frequency, and FIG. 10C depicts another example of CRM.

In order to measure a peak voltage, the detecting circuit may configured to derive the frequency of the signal at an expected peak of the power supply voltage. The expected peak may be found halfway between the detected zero crossings of the AC mains voltage.

The above converter may be applied as a front end converter in a combined front end-back end converter arrangement, whereby the front end converter, such as a flyback (step-up) converter, converts the (e.g. rectified) AC mains voltage into an intermediate supply voltage as well as possibly providing galvanic isolation from the mains and/or power factor correction, whereas the backend converter, converts the intermediate supply voltage into an LED supply voltage/current. FIG. 112 depicts such a front end converter 1000 back end converter 1010 arrangement driving LED fixture 1020, whereby the power supply voltage 1030 is provided as input to the front end converter and the output voltage 1040 of the front end converter is provided as input voltage to the back end converter, and whereby the back end converter provides the LED current 1050 to the LEDs 1020. Hence, the information relating to the power supply (zero crossings, surges, brown out, etc.) may be obtained by the back end converter using simple hardware, namely from a secondary side of the front end converter. Therefore, additional galvanic separation may be omitted and additional hardware at the primary side of the front end converter may likewise be omitted. Also, as the sensing circuit and detecting circuit connect to the secondary side of the front end converter, they may easily interface with the back end converter, in particular with the controller thereof. For example, the detecting circuit may be comprised in the controller (e.g. microprocessor) of the back end converter. The backend converter may hence adjust an illumination based on measured properties of the power supply, for example adjust the light output and/or colour in the case of a low power, brown out, etc. Also the backend converter may adjust a time modulation of the LEDs, for example in synchronism with a cycle of the power supply.

Using the switching frequency, the detector may e.g. be configured to determine whether or not the supply voltage is an AC voltage or a DC voltage, i.e. from the presence or absence of zero crossings where the transitions of the signal halt for some time as the momentary value of the supply voltage is too low. Thus, in case the supply voltage is an AC supply voltage, the repetition pattern of the transitions of the signal periodically stop around the zero crossings. In case the supply voltage is a DC supply voltage, no such periodic stopping will be detected. As such, in an embodiment of the present invention, the power converter can be configured to detect a changed supply, e.g. a change from a supply by means of an AC supply voltage to a supply by means of a DC supply voltage. When such a change is detected, the power converter may e.g. be configured to exhibit a certain, predetermined behavior. As an example, the power converter may e.g. be configured to adjust the output power of the converter upon detection of the changed supply voltage. As a particular example, in case of an emergency, it may be convenient to switch from a mains AC power supply to a DC power supply. As such a DC power supply may only enable powering for a limited amount of time, it might be worth to economize on the power consumed by the LED fixture that is powered. As, upon detection of a switch to a DC power supply, the power converter according to the present invention may e.g. be configured to reduce the power supplied to the LED fixture.

The secondary circuit may comprise an auxiliary winding, magnetically coupled with the primary winding, the sensing circuit being adapted to measure a voltage of the auxiliary winding as the electrical characteristic of the secondary circuit. In such arrangement, a scaling down of a sensed voltage for determining the supply voltage characteristic may be avoided by appropriate selection of the number of turns of the auxiliary winding.

Having knowledge about the frequency and timing (phase) of the supply voltage (in case of an AC- or rectified AC voltage) may also be advantageously used to select an appropriate modulation cycle or period for controlling illumination characteristics of an LED or LEDs of the LED fixture that is powered. Typically, illumination characteristics such as intensity or color of the LEDs of an LED fixture are controlled by providing a substantially constant current to the LEDs at a controllable duty cycle. In particular, during a predetermined period (referred to as the modulation cycle or period), the current is provided to the LED during a fraction (referred to as the duty cycle) of said period. Typically, such a modulation period may be a few ms. The appropriate selection of the modulation period is important to avoid aliasing effects. In particular, it may be advantageous to select the modulation period such that the period of the supply voltage (e.g. 20 ms in case of a 50 Hz supply or 16.67 ms in case of a 60 Hz supply) is a multiple of the modulation period. By doing so, interference effects and aliasing effects, e.g. when the driven LEDs are observed by capturing systems such as video cameras or television cameras, may be avoided.

In an embodiment, a modulation cycle or period of 3.33 msec may be advantageously be applied since both a 50 Hz period and a 60 Hz period are multiples of such modulation period. When a fixed modulation period is applied, this may e.g. imply that an illumination set point, e.g. a desired color or intensity may be adjusted at the same rate, i.e. determined by the modulation period.

In an embodiment, the power converter 10 comprises, as part of the secondary circuit 12, a controller such as a microprocessor or microcontroller for controlling an LED fixture that is powered using an output voltage 21 as provided by the secondary winding 14.

In an embodiment, the detector 20 may be incorporated into a controller controlling the LED fixture.

Some examples of phenomena that may be detected, as they have an influence on the signal, are described below:

Mains Presence Detection:
When there are one or more pulse edges each mains period, it can be concluded that the mains is present.

Mains Type [e.g. AC/DC/Square AC]:
With AC the frequency is varying and zero crossings occur.
With DC the frequency is fixed and there are no zero crossings.
With square AC, the frequency is switching between 2 fixed frequencies.

Mains Zero Crossing Detect and Synchronisation:
For certain applications it is useful to synchronize driver switching to the mains. To that end, the zero-crossings can be detected and a time base can be constructed based on the measured zero-crossings. The time base would be constructed such that an incidental failure in the measurements would not compromise the time-base.

Mains Voltage:
The frequency of the front end in-/decreases when the mains voltage rises. By counting the pulses in a known interval, a measure for the mains voltage will be obtained. The nominal mains voltage can thus be measured and classified into the typical classes and reported to the outside world.

Mains Current:
There is no direct way of measuring the mains current. There exist however FE controllers that measure the mains current. Such a FE-controller can communicate the current value to the driver via the front-end-detect signal through MPP (Missing Pulses Protocol) or a functionally equivalent method.

Mains Metering:
When both voltage and current are known in the driver with enough accuracy and time resolution, the driver or a LED code connected unit or the cloud may calculate energy consumption from them. Providing voltage, current and possibly calculated power and energy values contributes to fulfil metering requirements.

Surges:
Dependent on the workings of the front-end controller a surge can be detected.
a) With a standard FE controller:
Detect the surge from a sudden higher frequency of pulses→check if this is correct
b) With an FE controller that stops switching during a surge:
Detect a gap where you would not expect it, typically around the top of the sinewave.

Interruptions:
Interruptions of a significant length cause a gap between the pulses.
If the gap occurs at a location in the sine wave where it was not expected or when the zero-crossing gap takes longer than expected, then a likely cause is an interruption of the mains.

Brown-Outs:
With a brown-out, the mains voltage has a sag/dip causing the pulse frequency in the signal to become higher.
This can be detected and reported.

It is noted that, with the phenomena above, the measurement method, resolution and accuracy have an influence on what can be detected and how accurate. For example when the number of pulses per time-unit are counted over a longer time period such as a second, no separate surges or interruptions can be observed as their influence may be averaged out to become insignificant with respect to normal measurement tolerances. However when the number of pulses are counted every 5 milliseconds or every 100 us, then a surge may be detected almost immediately and reported almost immediately.

Some embodiments that may make use of the techniques described above include:

1: Measure mains presence
   a)
   Feed the signal to a digital input port of the microprocessor.
   Connect it to a counter internal to the uP.
   Reset the time at the start of a suitable measurement interval for example 1 half-period of the mains (note: typically this measurement interval is not synchronised to the mains)
   Check if the counter has a non zero value, if so mains is detected. For avoidance of erratic conclusions the counter could be checked using a higher threshold value than 1.
   b)
   Feed the signal to a digital input port of the uP.
   Feed it to a uP internal hardware unit that can remember an edge has occurred (for example a D flipflop or a unit such as the CLC in microchip processors)
   Reset the hardware unit at the start of the measurement interval
   Read the state of the hardware unit at the end of the interval.
   c)
   Feed the signal to an input port of the uP.
   Sample the state of the input port.
   In case the sample was a 1 (digital port) or a voltage higher than midway the clamping voltages (analog port), conclude that a pulse has occurred and decide mains is present.
   Keep doing this at regular sampling instants during the measurement interval where the sampling instants shall be less apart in time than the minimum pulse width.

2: Measure mains zero-crossing
   a)
   Feed the signal to an input port of the microprocessor.
   Use a dedicated zero-crossing detect circuit internal to the processor to detect a zero-crossing.
   Connect the output of the zero-crossing detect circuit to a counter or timer directly or via an interrupt mechanism
   Read the counter/timer value to know the inter-crossing time.
   Wrong: this detects the zero-crossings of each pulse. This can be used though when the signal does not have pulses but is high during almost the entire half-sine except where the zero-crossing occurs. With a different coupling circuit this can be realized. We have this and it is named "mains-detect" signal as opposed to the pulsed signal which is named "front-end-detect" signal.
   ==Construct a time base based on the measured inter-crossing time:==
   Calculate a moving average using the inter-crossing times.
   Load a counter or timer using the inter-crossing-average time
   Decrement the timer/counter using some clock in the microprocessor
   When the timer/counter arrives at zero, reload it with the inter-crossing-average time.
   To account for time delay in the measurement, it may be so that the actual zero-crossing takes place before the timer/counter has reached zero. In that case the client software process of the zero-crossing timing may be signalled that a zero-crossing has been reached at some higher value of the counter. The software awareness of when a crossing occurs can thus be tuned to coincide with the actual crossing by changing this value.
   b)
   Feed the signal to an input port of the microprocessor.
   Count the number of pulses on the signal during a time Tzd. Tzd can be chosen to be 1 ms or less.
   As soon as the number of pulses during the time Tzd before "now" is zero, a zero-crossing is ongoing.
   Tzd must be chosen such that it fits to waveform of the signal. The waveform of the signal can have non-clamped pulses around the zero-crossing for a wide time interval or it can have such pulses only during a small interval depending on amplification and clamping dimensioning in the coupling circuit as well as the mains voltage when the driver is conform a given design.
   A delay in detecting the zero-crossing can be compensated as stated under a) when constructing the time-base in a similar manner.
   False zero-crossing detections (for example due to a brown-out or interruption) are to be filtered out by the time-base construction mechanism.

3: Measure Mains voltage
   a)
   Feed the signal to a digital input port of the microprocessor.
   Connect the internal representation of the signal to a counter.
   Reset the counter at start of the measurement interval.
   Read the counter at the end of the measurement interval.
   Choose a measurement interval suitably:
     For example use a 1.67 ms interval. This fits 5 times in a 60 Hz half-sine and 6 times in a 50 Hz half-sine.
   The counter value received each 1.67 ms is a measure for the mains voltage.
   By using a predetermined calibration table, the mains voltage corresponding to a counter value can be looked up and communicated to the outer world, stored or used as an input in an algorithm.
   Determine the highest value counter value every 6 counter values, look up the mains voltage belonging to it via the table, divide this mains voltage by sqrt(2) and the measurement value of the nominal mains voltage is achieved.
   When the measurement interval is not synchronized to the mains, the highest counter value will have a large tolerance range. This can be improved by synching the measurement interval to the mains in such a way that the measurement interval delivering the highest value of pulses is positioned symmetrically around the top of the sine-wave.
   The nominal mains voltage achieved in this way can be mapped to a standard nominal voltage (50 Hz, 60 Hz, 400 Hz, etc.) which is subsequently reported.
   The nominal mains voltage achieved in this way can be mapped to voltage ranges and per range a counter can count the occurrences where the mains voltage is measured within that range during a statistical data gathering period. The accumulated data can be represented as a bar chart to users. The statistical work can be done in the driver but more likely in the connected network or the cloud.
   b)
   Starting point is that the mains voltage is measured in the FE controller.
   Communicate the mains voltage from the FE controller to the BE controller via the front-end-detect signal.

The FE controller transmits the value as follows:
Convert the mains voltage to a time duration Tv
Start the time by skipping 1 switching cycle of the power switch that switches the primary winding
This delivers 1 missing pulse in the FED signal.
Count time until the mains-voltage-time Tv is reached.
Skip another switching cycle of the power switch that switches the primary winding
The BE controller receives the value as follows:
The BE controller detects whether or not a pulse is missing in the front-end-detect (FED) signal.
When so it starts a timer/counter in order to measure the time to the next missing pulse.
When the next missing pulse is detected the timer/counter holds a value representative of the mains voltage.
Note: this must be detailed as to the resolution, accuracy and other properties of this method as these are limited by f.e. the uncertainty in time of the starting and ending missing pulse.
To avoid a mistake between a start missing pulse and an end missing pulse, the start could consist of 2 consecutive missing pulses or of 1 missing pulse, a pulse and again a missing pulse. This start sequence is named a pre-amble in the sequel.

e.g.
111110011111111111111111111111111111111111111111111111111
1110111111111111111111111111111 Or
1111101011111111111111111111111111111111111111111111111
11111111110111111111111111111111111111

The effect of multiple missing pulses on the stability of the delivered power from FE to BE is as yet unknown.

4: Measure mains current:
Starting point is that the mains voltage is measured in the FE controller.
For the rest the same method of communicating this value to the BE controller as under 3b) is used.
The pre-amble used can best be different from the pre-amble used for other quantities such as mains voltage.
Constructing pre-ambles with many consecutive missing pulses or with too many missing pulses in a short period of time may influence the power delivery function of the FE. This is a topic to be further investigated. This may limit the pre-ambles that may be practically constructed.

5: Mains metering:
Under mains metering we will understand:
Energy measurement (kWh)
Power measurement (real: kW blind: kVA; Power Factor)

6: Surges:
See mains voltage measurement.
When comparing each counter value per 1.67 ms period with an expected value based on the measured nominal voltage, a significant deviation can be detected. For example a deviation of more than 5% (USA) or 6% (possibly future EU) or 10% (current EU) from the expected value could be considered a surge (or sag/brown-out).
For accepting a surge as an actual surge, these tolerances will likely be higher as the uncertainty of the measurement method has to be added. This uncertainty is higher for a non-mains-synced measurement interval than for a mains-synced measurement interval.
It is possible to diminish the measurement interval to detect narrower surges.
For a surge with a duration longer than 1 measurement period care must be taken in the measurement value processing in order to count the surge as only 1 occurrence. Surge duration could be a delivered outcome when a surge endures more than 1 measurement interval. Surge peak voltage can be estimated using the counter value. An error in that latter value will occur due to the averaging over the measurement interval.

7: Interruptions
a)
Mains interruptions can be measured using the method of 6:
When a counter value is near zero, an interrupt is the most likely cause.
When the interrupt takes no longer than a few measurement intervals, it may be only reported on.
When the interrupt takes longer, actions can be taken to either protect the driver or to deliver some minimum level of light as long as possible.
b)
Another possibility is to measure how long no more pulses are received in the FED signal.
After a threshold amount of time this situation is considered an interrupt.
Etc. as under a)

8: Brown-outs:
Brown-outs can be measured such as surges.
Brown-outs cause less stress on components versus surges when not present for long.
Reporting minimum voltage of the brownout and brown-out duration are among the possibilities.
If brown-out takes too long, actions like lowering light output may be performed.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfill the functions of several items recited in the claims.

The invention claimed is:
1. A power converter for supplying an output voltage or an output current for powering an LED fixture from a power supply, the power converter comprising:
   a primary circuit comprising:
      an input terminal for connecting to the power supply;
      a primary winding connected to the input terminal; and
      a switch in series connection with the primary winding to in a conductive state of the switch connect the primary winding to the power supply;
   a secondary circuit comprising:
      a secondary winding that is magnetically coupled with the primary winding for providing an alternating voltage in response to a switching of the switch;
      a diode connected to the secondary winding to rectify the alternating voltage;
      a capacitor connected to the diode to buffer the rectifies alternating voltage and provide the output voltage or current;
      a sensing circuit configured to generate a signal representative of the output voltage of the secondary winding, an edge of the signal representing an edge of the output voltage of the secondary winding in response to the switching of the switch; and
      a detecting circuit configured to derive timing data from the edge of the signal, to estimate a load of the power converter from at least one output parameter of the power converter, and to determine a momentary value of a voltage of the power supply from the timing data and the estimated load of the power converter.

2. The power converter according to claim 1, wherein the timing data comprises at least one of a frequency of the signal and a duty cycle of the signal.

3. The power converter according to claim 1, wherein the output parameter of the power converter comprises at least one of:
   an illumination setpoint of the LED fixture,
   an output voltage and an output current of the power converter, and
   an output voltage of the power converter, an LED fixture current and an LED fixture voltage.

4. The power converter according to claim 1, wherein the detecting circuit is configured to
   detect, from the signal representative of the output voltage of the secondary winding, extremes in at least one of the frequency and the duty cycle of the signal,
   derive a periodicity of the extremes from a time pattern of the extremes, and
   derive information representative of frequency and timing of the power supply from the periodicity of the extremes and the time pattern of the extremes.

5. The power converter according to claim 4, wherein the deriving the periodicity of the extremes from the time pattern of the extremes comprises determining times between detected extremes, averaging the times between the detected extremes and deriving the periodicity from the averaged times between the detected extremes.

6. The power converter according to claim 4, wherein the extremes correspond to zero crossings or peak values in the voltage of the power supply.

7. The power converter according to claim 4, wherein the extremes correspond to zero crossings in the voltage of the power supply, and wherein the detecting circuit is configured to
   detect a periodic time pattern in the zero crossings of the power supply,
   mask zero crossings in synchronism with the periodic time pattern, and
   detect remaining time periods in which the power supply subceeds a low voltage threshold from the at least one of the frequency and the duty cycle of the signal.

8. The power converter according to claim 7, wherein the low voltage threshold is time dependent, a waveform of the low voltage threshold following a nominal waveform of the power supply voltage.

9. The power converter according to claim 8, wherein the power converter is configured to respond to an overvoltage of the power supply by stopping the switching, the detecting circuit being configured to signal an overvoltage condition when the signal representative of the output voltage of the secondary winding stops the switching, and
   wherein the detecting circuit is configured to signal the overvoltage when outside the masked zero crossings.

10. The power converter according to claim 9, wherein the detecting circuit is configured to
   drive the LEDs at a power saving setting in response to signalling the undervoltage.

11. The power converter according to claim 8, wherein the power converter is configured to respond to an undervoltage of the power supply by stopping the switching, the detecting circuit being configured to signal an undervoltage condition when the signal representative of the output voltage of the secondary winding stops the switching, and
   wherein the detecting circuit is configured to signal the undervoltage when outside the masked zero crossings.

12. The power converter according to claim 1, wherein the power converter is configured to respond to an overvoltage of the power supply by stopping the switching, the detecting circuit being configured to signal an overvoltage condition when the signal representative of the output voltage of the secondary winding stops the switching.

13. The power converter according to claim 1, wherein the power converter is configured to
   respond to an undervoltage of the power supply by stopping the switching, the detecting circuit being configured to
   signal an undervoltage condition when the signal representative of the output voltage of the secondary winding stops the switching.

14. The power converter according to claim 1, wherein the detecting circuit is configured to derive the at least one of the frequency and the duty cycle of the signal at an expected peak of the power supply voltage.

15. The power converter according to claim 14, wherein the detecting circuit is configured to drive the LEDs at a power saving setting in response to signalling the undervoltage.

16. The power converter according to claim 1, wherein the detecting circuit is configured to derive the at least one of the frequency and the duty cycle of the signal at an expected zero crossing of the power supply voltage.

17. The power converter according to claim 1, wherein the momentary value of the voltage of the power supply is the peak voltage, the detecting circuit is configured to compare the peak value to at least one of an undervoltage threshold and an overvoltage threshold, and to detect an overvoltage when the overvoltage threshold is exceeded respectively to detect an undervoltage when the undervoltage threshold is subceeded.

18. The power converter according to claim 17, wherein the detecting circuit is configured to drive the LEDs at a power saving setting in response to signalling the undervoltage.

19. The power converter according to claim 1, wherein the detecting circuit is configured to
derive an operation mode of the power converter from a variation over time of at least one of frequency and duty cycle of the signal.

20. The power converter according to claim 1, wherein the detecting circuit is configured to
establish if a undervoltage exceeds a predetermined duration, and
drive the LEDs at a power failure setting if the undervoltage exceeds the predetermined duration.

21. The power converter according to claim 1, wherein the detecting circuit is configured to
establish if a overvoltage exceeds a predetermined duration, and
drive the power converter to stop switching if the undervoltage exceeds the predetermined duration.

22. The power converter according to claim 1, wherein the detecting circuit is configured to transmit data concerning overvoltage or undervoltage to a remote server.

23. The power converter according to claim 1, wherein the detecting circuit is configured to store data concerning overvoltage or undervoltage in a memory of the detecting device.

24. The power converter according to claim 1, wherein the detecting circuit is configured to determine an effective voltage of the power supply, to estimate an electrical power consumption of the power converter from the determined effective voltage of the power supply and an output parameter of the power converter, the detecting circuit being configured to accumulate over time data relating to the estimated electrical power consumption.

25. The power converter according to claim 1, wherein the detecting circuit is configured to determine an effective voltage of the power supply, to estimate an electrical energy consumption of the power converter from the determined effective voltage of the power supply and an output parameter of the power converter, the detecting circuit being configured to accumulate over time data relating to the estimated electrical energy consumption.

26. The power converter according to claim 1, wherein the signal representative of the output voltage of the secondary winding is a binary signal.

27. An LED driver circuit for driving an LED fixture, the LED driver circuit comprising
the power converter according to claim 1, and
a back end converter having an input connected to the secondary circuit of the power converter and having an output connected to the LED fixture,
wherein the back end converter comprises a back end converter controller configured to control a switching of the back end converter, and wherein the detecting circuit is implemented by the back end converter controller.

* * * * *